(12) United States Patent
Reinartz et al.

(10) Patent No.: US 6,617,745 B1
(45) Date of Patent: Sep. 9, 2003

(54) ENGINE PUMP UNIT

(75) Inventors: Hans-Dieter Reinartz, Frankfurt am Main (DE); Dieter Dinkel, Eppstein/Ts. (DE); Jochen Burgdorf, Offenbach (DE); Günter Kiehnle, Eppingen (DE)

(73) Assignee: Continental Teves AG & Co.OHG, Frankfurt (DE)

( * ) Notice: Subject to any disclaimer, the term of this patent is extended or adjusted under 35 U.S.C. 154(b) by 0 days.

(21) Appl. No.: 09/380,817

(22) PCT Filed: Mar. 10, 1998

(86) PCT No.: PCT/EP98/01366
§ 371 (c)(1),
(2), (4) Date: Jan. 21, 2000

(87) PCT Pub. No.: WO98/40954
PCT Pub. Date: Sep. 17, 1998

(30) Foreign Application Priority Data
Mar. 10, 1997 (DE) .......................................... 197 09 777

(51) Int. Cl.$^7$ ........................ H01R 39/40; H01R 39/38; H01R 39/44; H02K 13/00; H02K 13/12

(52) U.S. Cl. ..................... 310/247; 310/242; 310/229; 310/233; 310/237; 417/415

(58) Field of Search ................. 417/415, 273; 310/239, 148, 127, 242, 237, 233, 238, 231, 219, 232, 247, 245; 303/116.4

(56) References Cited

U.S. PATENT DOCUMENTS

| | | | | |
|---|---|---|---|---|
| 1,671,009 A | * | 5/1928 | Body ......................... | 417/415 |
| 3,244,917 A | * | 4/1966 | Gute ...................... | 310/154.08 |
| 4,080,541 A | | 3/1978 | Mazzorana ................. | 310/89 |
| 5,508,577 A | * | 4/1996 | Shiga et al. ................ | 310/201 |
| 5,530,311 A | | 6/1996 | Ziegler ........................ | 310/237 |
| 5,668,422 A | | 9/1997 | Deynet ......................... | 310/71 |
| 5,688,028 A | * | 11/1997 | Kohno et al. ............ | 303/116.4 |
| 5,895,207 A | * | 4/1999 | Burgdorf et al. ......... | 417/410.1 |
| 6,078,118 A | * | 6/2000 | Reinartz et al. ............... | 310/89 |
| 6,179,580 B1 | * | 1/2001 | Huber et al. ................ | 417/415 |
| 6,208,048 B1 | * | 3/2001 | Deynet ......................... | 310/71 |
| 6,283,732 B1 | * | 9/2001 | Reinartz et al. ............ | 417/440 |
| 6,420,811 B1 | * | 7/2002 | Wetzel ........................ | 310/112 |
| 6,481,981 B1 | * | 11/2002 | Burgdorf ..................... | 417/360 |

FOREIGN PATENT DOCUMENTS

| | | |
|---|---|---|
| DE | 25 00 296 | 7/1975 |
| DE | 34 08 023 | 9/1984 |
| DE | 34 39 831 | 6/1985 |
| DE | 40 36 754 | 5/1992 |
| DE | 41 20 665 | 12/1992 |
| DE | 41 33 879 | 4/1993 |
| DE | 43 20 005 | 1/1995 |
| DE | 44 33 972 | 3/1996 |
| EP | 0 645 875 | 3/1995 |
| EP | 0 728 645 | 8/1996 |

* cited by examiner

Primary Examiner—Karl Tamai
Assistant Examiner—Guillermo Perez
(74) Attorney, Agent, or Firm—Rader, Fishman & Grauer PLLC

(57) ABSTRACT

The invention relates to a motor-driven pump unit, in particular for antilock systems of motor vehicles, with an electric motor that is arranged on one side of a pump unit and an electronic unit that is arranged on another side of the pump unit and fastened thereto. The main aspect of the invention is that means are provided for an axially movable attachment and contacting of carbon brushes in connection with an axial installation of the unit. In this way, the individual components of the unit can be assembled axially in a simple manner and at low cost. In addition, the unit requires very little space.

6 Claims, 1 Drawing Sheet

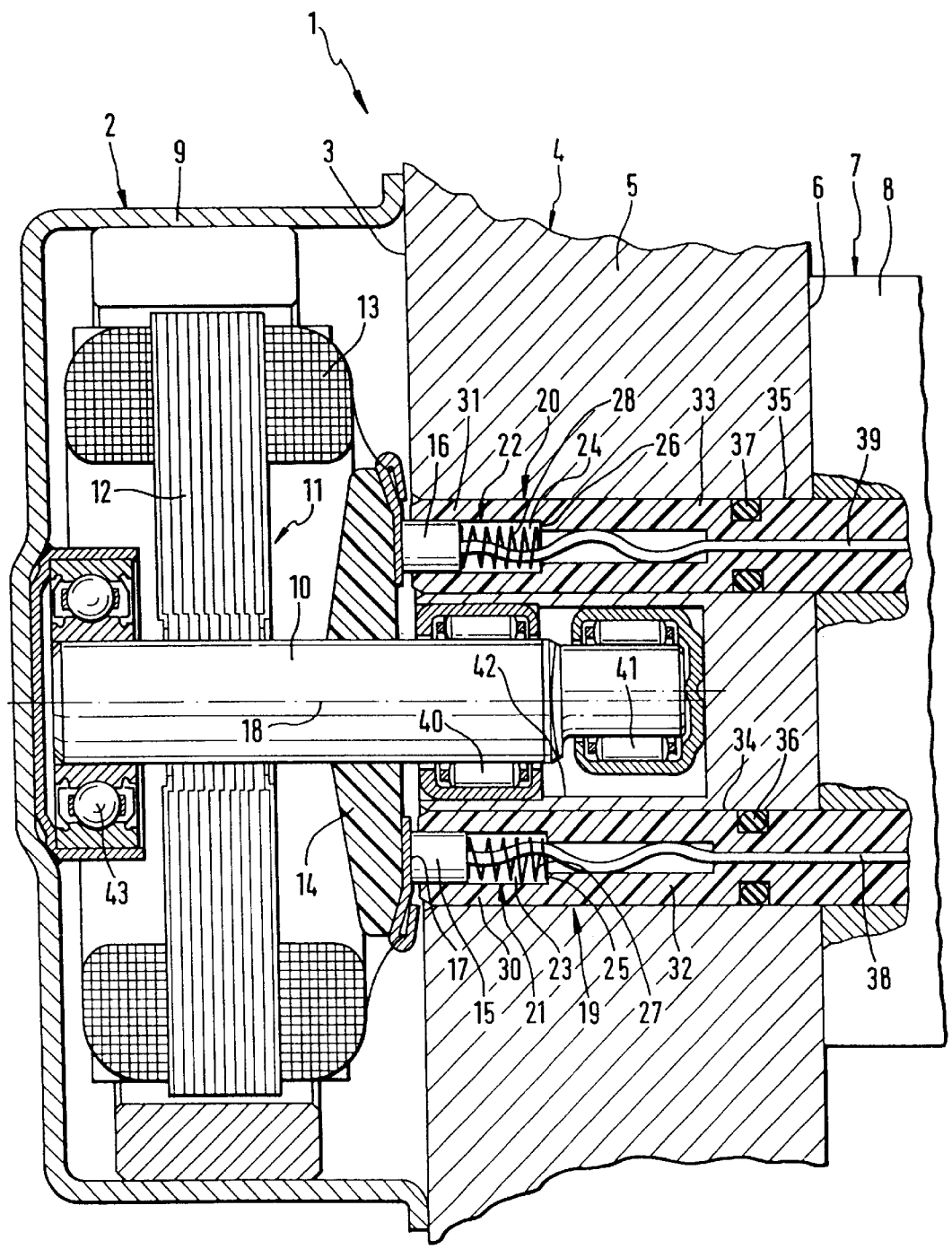

ENGINE PUMP UNIT

TECHNICAL FIELD

The present invention relates to a motor-driven pump unit, in particular for antilock systems of motor vehicles.

BACKGROUND OF THE INVENTION

A motor-driven pump unit of this type already is disclosed in EP 645 875 B1. It comprises an electric motor arranged on one side of a pump unit and an electronic unit arranged on another side of the pump unit. A commutator is mounted at the shaft end of the electric motor that faces away from the pump, and this commutator is acted upon by radially arranged carbon brushes. A supply line that runs through the motor and pump housing up to the electronic unit supplies power to these carbon brushes. The motor-driven pump unit can be improved, because measures have to be taken that the carbon brushes and the brush holding plate can be lowered radially to the commutator after mounting the rotor and the motor housing. For this reason, special tubular brush-holders for the carbon brushes have been proposed, with which the brushes would be held in a retracted position and could be pushed radially out of the tubular brush-holder in the direction of the commutator after a releasing device is activated. However, the tubular brush-holders are no longer accessible after the brush holding plate and motor housing have been mounted, and this is an added problem.

Another disadvantage is that the overall length of the unit increases in relation to the width of the commutator. Little mounting space and particularly a short overall length count among the basic requirements for a unit for motor vehicles. Hence, the object of the present invention is to propose a motor-driven pump unit that can be assembled easily is very small in its assembled state. Furthermore, the contacting between the electrical components is to be simplified.

This object is solved by the present invention by providing means for an axially movable holding device and for the electric contacting of carbon brushes in connection with an axial installation of the unit. Due to the axially movable arrangement of the carbon brushes, it is not necessary to hold back the carbon brushes during certain installation steps on the one hand, and on the other hand the overall length of the entire unit is essentially rendered independent of the width of the commutator because, according to the invention, an axially effective commutator can be used. And, finally, the motor according to the invention does not require a brush holding plate.

BRIEF DESCRIPTION OF THE DRAWING

FIG. 1, shows a sectional view of a motor-driven pump unit according to the invention.

DETAILED DESCRIPTION OF THE PREFERRED EMBODIMENTS

A motor-driven pump unit 1 is used especially for antilock systems in motor vehicles. It comprises an electric motor 2, which is mounted on one first side 3 of a pump unit 4 with a pump housing 5 and fastened thereto. An electronic unit 7 with a housing 8 is mounted on another second side 6 of the pump housing 5 and fastened thereto. The electronic unit 7 basically serves to activate electromagnetic valves (not shown) used for regulating the brake pressure in brake circuits. The electric motor 2 has a pot-shaped housing 9. Inside the housing there is a motor shaft 10 with a rotor 11 that has an armature 12 and windings 13. An essentially disc-shaped commutator 14, which is resiliently acted upon in an axial direction by carbon brushes 15, 16, is mounted with torsional strength on the motor shaft 10. Its contact surface 14 is effective in an axial direction and extends at an right angle to a rotary axis 18 of the electric motor 2.

Means 19, 20 are provided for an axially movable holding device and contacting of the carbon brushes 15, 16 in connection with an axial installation of the unit. As shown in the drawing, the means 19, 20 are provided on the electronic unit 7, thus, together with the carbon brushes 15, 16, they form an electric constructional unit The carbon brushes are located at the level of the pump housing 5, so that the electric motor 2 is shortened by the dimension of the carbon brushes 15, 16. Besides the carbon brushes 15, 16, no contacting of additional electric components of the electric motor 2 or the pump unit 4 is necessary. As means 19, 20 the electronic unit 7 has two guide elements 21, 22 for the carbon brushes 15, 16, which are effective parallel to the rotary axis 18. Each guide element 21, 22 is axially aligned to the commutator 14 and essentially comprises a box 23, 24 open towards the motor, which has a stop surface 25, 26 at the end. A pressure spring which resiliently prestresses the carbon brushes 15, 16 in the direction of the contact surface is arranged between the stop surfaces 25, 26 and the carbon brushes 15, 16.

It should be noted that the means 19, 20 can also be integrated in the pump housing 5 separately, i.e. independently of the electronic unit.

According to the embodiment shown in the drawing, the guide elements 21, 22 are arranged at the ends 30, 31 of protruding arms 32, 33, and the number of arms 32, 33 corresponds to the number of carbon brushes. The arms 32, 33 are arranged in a circular path concentrically to the motor shaft 10, and they essentially extend parallel to the axis of the motor shaft 10 in the direction of the commutator 14. As shown in the figure, the arms 32, 33 extend through holes 34, 35 of the pump housing 5 and have sealing elements 36, 37 which bear against the wall of the hole. It should be noted that conducting elements 38, 39, which serve to ensure the electric contacting of the carbon brushes 15, 16, run inside the arms 32, 33 and lead to electric connection elements in the vicinity of the electronic unit 7. Thus no separate electric connection is needed for the electric motor 2.

Basically the motor-driven pump unit is assembled as described below. In a first step the rotor 11, the motor shaft 10, the commutator 14 mounted with torsional strength on the motor shaft and the pushed on bearing elements 40, 41 are inserted axially in a location hole 42 of the pump housing 5, so that the bearing element 41 for the pump eccentric with its pot-shaped bottom lies against the bottom of the location hole 42. In a second step the housing of the electric motor 9 is axially pushed onto the free end of the motor shaft 10 and fastened to the pump unit 4. It would be advantageous if the pot-shaped bottom of the motor housing 9 had a corresponding cup for holding the support bearing 43. In a final step the electronic unit 7 is axially pushed onto the pump unit 4 in the direction of the motor 2, so that arms 32, 33 extend through the pump unit 4. Since the carbon brushes 15, 16 are arranged in an axially movable manner on the electronic unit 7, no measures are needed to retain them in a retracted position, as would be the case in a radial arrangement of the carbon brushes.

What is claimed is:

1. A motor driven pump unit for antilock brake systems, comprising:

an electric motor including a rotor, a pump operatively coupled to the electric motor, said pump including a pump housing, an electronic control unit including at least one carbon brush coupled to at least one brush holder, wherein said brush holder extends from said electronic control unit, through a hole in the pump housing and into an inner portion of said motor in proximity to said rotor, and wherein said at least one carbon brush extends, at least partially into said hole in the pump housing, means, coupled to said at least one brush holder, for axially guiding said at least one carbon brush, wherein said pump housing is positioned between said electric motor and said electronic control unit.

2. A motor-driven pump unit according claim 1, wherein the at least one brush holder extends parallel to a rotary axis of the rotor.

3. A motor-driven pump unit according claim 2, wherein the at least one carbon brush is arranged in alignment with a commutator on said rotor, and wherein said commutator has a contact surface that is at a right angle to a rotary axis of the rotor.

4. A motor-driven pump unit according to claim 1, wherein said at least one brush holder includes at least two brush holders which are arranged concentrically to the rotary axis of the rotor.

5. A motor-driven pump unit according to claim 4, wherein the brush holders extend parallel to the axis of the rotor.

6. A motor-driven pump unit according to claim 4, comprising at least two protruding arms that are arranged concentrically to the motor shaft.

* * * * *